(12) United States Patent
Chang (10) Patent No.: US 7,418,097 B2
(45) Date of Patent: Aug. 26, 2008

(54) PORTABLE ELECTRONIC DEVICE CLAMP

(76) Inventor: Ta Shuo Chang, 3F. No. 37, Sec. 3, MuJa Rd., Taipei (TW)

( * ) Notice: Subject to any disclaimer, the term of this patent is extended or adjusted under 35 U.S.C. 154(b) by 797 days.

(21) Appl. No.: 11/011,202

(22) Filed: Dec. 15, 2004

(65) Prior Publication Data

US 2006/0126824 A1    Jun. 15, 2006

(51) Int. Cl.
*H04M 1/00*    (2006.01)

(52) U.S. Cl. .................. 379/446; 379/450; 379/455

(58) Field of Classification Search ........... 379/428.01, 379/441, 445, 446, 447, 450, 454; 455/575.1, 455/90.3; 248/316.4, 316.1
See application file for complete search history.

(56) References Cited

U.S. PATENT DOCUMENTS

| | | | | |
|---|---|---|---|---|
| 5,694,468 | A * | 12/1997 | Hsu | 379/446 |
| 6,229,891 | B1 * | 5/2001 | Chen | 379/446 |
| 6,286,737 | B1 * | 9/2001 | Whitley | 224/271 |
| 6,366,672 | B1 * | 4/2002 | Tsay | 379/446 |
| 2002/0190176 | A1 * | 12/2002 | Louh | 248/316.4 |
| 2004/0179678 | A1 * | 9/2004 | Hsu Li | 379/441 |

FOREIGN PATENT DOCUMENTS

| | | |
|---|---|---|
| TW | 092203182 | 2/2004 |
| TW | 091213179 | 3/2004 |

* cited by examiner

*Primary Examiner*—Curtis Kuntz
*Assistant Examiner*—Tuan Duc Nguyen (57) ABSTRACT

Provided is a clamp for fastening a portable electronic device. The clamp comprises two spring biased sliding arms and a spring biased trigger member. Pushing the trigger member toward the body will move the shuttle member upward to unlock both arms for extending thereafter. In response to sandwiching the device between the arms releasing the trigger member will push the trigger member outward and the shuttle member downward respectively for locking the ridges. In a case of the device having its ports provided at one side or both sides thereof, two central, rectangular openings of the arms are adapted to allow the ports to dispose therein for causing no interference to a normal operation of the fastened device. A distance between both arms can be adjusted by sliding one arm toward or away from the other arm or sliding both arms toward or away from each other.

8 Claims, 7 Drawing Sheets

PORTABLE ELECTRONIC DEVICE CLAMP

BACKGROUND OF THE INVENTION

1. Field of the Invention

The present invention relates to clamps and more particularly to an improved clamp for fastening a portable communication device (e.g., cellular phone or smart phone) or a portable computer (e.g., PDA (personal digital assistant)).

2. Description of Related Art

Both Taiwanese Patent Application No. 092,203,182 entitled "Improved Device for Holding Cellular Phone" and Taiwanese Patent Application No. 091,213,179 entitled "Hands-free Device for Holding Cellular Phone" have a drawback of being unable to firmly clamp a cellular phone when ports of the cellular phone are provided at one side or both sides thereof. Hence, a need for improvement exists.

SUMMARY OF THE INVENTION

It is an object of the present invention to provide a clamp for fastening a portable electronic device (e.g., cellular phone, smart phone, or PDA) between both sliding arms. Moreover, in a case of the electronic device having its ports provided at one side or both sides thereof, a central, rectangular opening of either arm is adapted to allow the ports to dispose therein for causing no interference to a normal operation of the fastened electronic device.

It is another object of the present invention to provide a clamp for fastening a portable electronic device wherein a distance between both arms is adapted to adjust by sliding one arm toward or away from the other arm or sliding both arms toward or away from each other.

To achieve the above and other objects, the present invention provides a clamp for fastening a portable electronic device comprising a body comprising a front cover of substantially rectangular, the front cover, on its back, comprising an intermediate recess open to its both sides, two parallel plates disposed in the recess, two upper, longitudinal slits disposed at its both sides, two transverse first grooves each disposed below the slit, an enlarged, transverse second groove disposed between the first grooves and being in communication therewith, two transverse third grooves each disposed externally of the slit, and a transverse fourth groove disposed below the first and second grooves; and a rear cover dimensioned and shaped to releasably secure to the front cover; two first resilient members each disposed in an upper portion of the slit; a second resilient member anchored in the second groove; a trigger member comprising a finger tab disposed externally of the body, a slanted slot proximate the finger tab, a riser disposed in the second groove, and a distal, internal oblique surface wherein the second resilient member is put on the trigger member and has one end urged against the riser; a shuttle member comprising a horizontal member disposed in the fourth groove, two vertical members each disposed in a lower portion of the slit for urging the first resilient member upward, two notches each disposed in the vertical member so that the trigger member is adapted to dispose across the notches, two slopes each disposed at an upper edge of the notch, and two latches each disposed on an underside of the vertical member; left and right arms each comprising a clamping section extended forwardly and a transverse sliding section slidably projected from one end opening of the recess, the sliding section including a plurality of parallel ridges on its top, an intermediate cavity, and a transverse pin in the cavity; a third resilient member substantially anchored in a space defined by the plates and having its right portion put on one pin and its left portion put on the other pin; and whereby pushing the finger tab toward the body will move the shuttle member upward to compress the first resilient members, cause the latches to clear the right and left ridges, and cause the third resilient member to expand for extending both the left and right arms; and in response to placing the electronic device between the clamping sections and engaging therewith releasing the finger tab will expand the first and second resilient members to push the trigger member outward and the shuttle member downward respectively for causing the latches to lockingly engage with the left and right ridges.

The above and other objects, features and advantages of the present invention will become apparent from the following detailed description taken with the accompanying drawings.

DETAILED DESCRIPTION OF THE PREFERRED EMBODIMENTS

Referring to FIGS. 1 to 7, there is shown a clamp 1 for fastening a portable electronic device in accordance with a preferred embodiment of the invention. The upright clamp 1 comprises a front cover 11, a rear cover 17, a trigger member 13, a shuttle member 14, a left arm 15, a right arm 16, and two resilient members 12. Each component will be described in detailed below.

Figure 1:
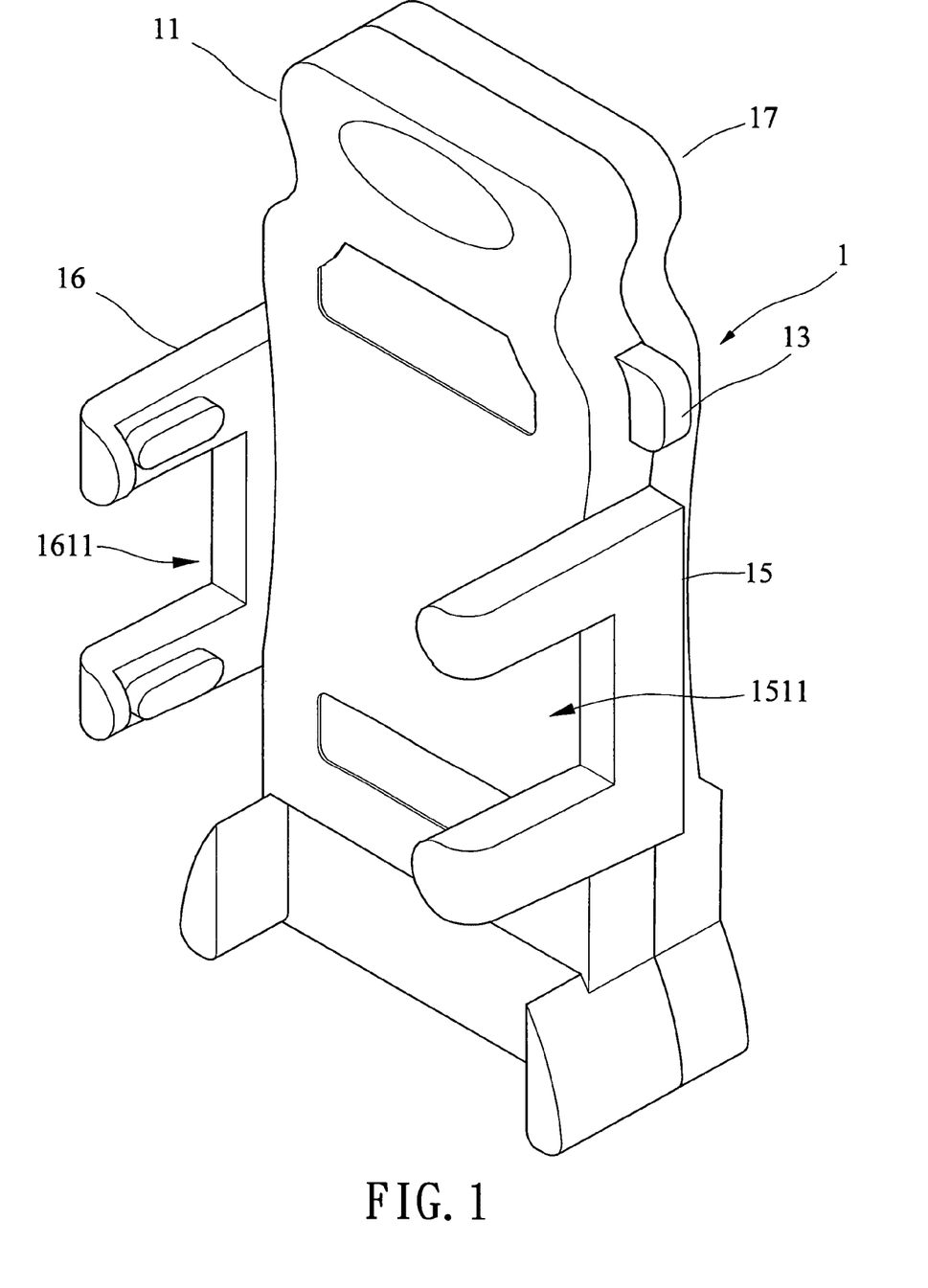
FIG. 1 is a perspective view of a preferred embodiment of portable electronic device clamp according to the invention.
Figure 2:
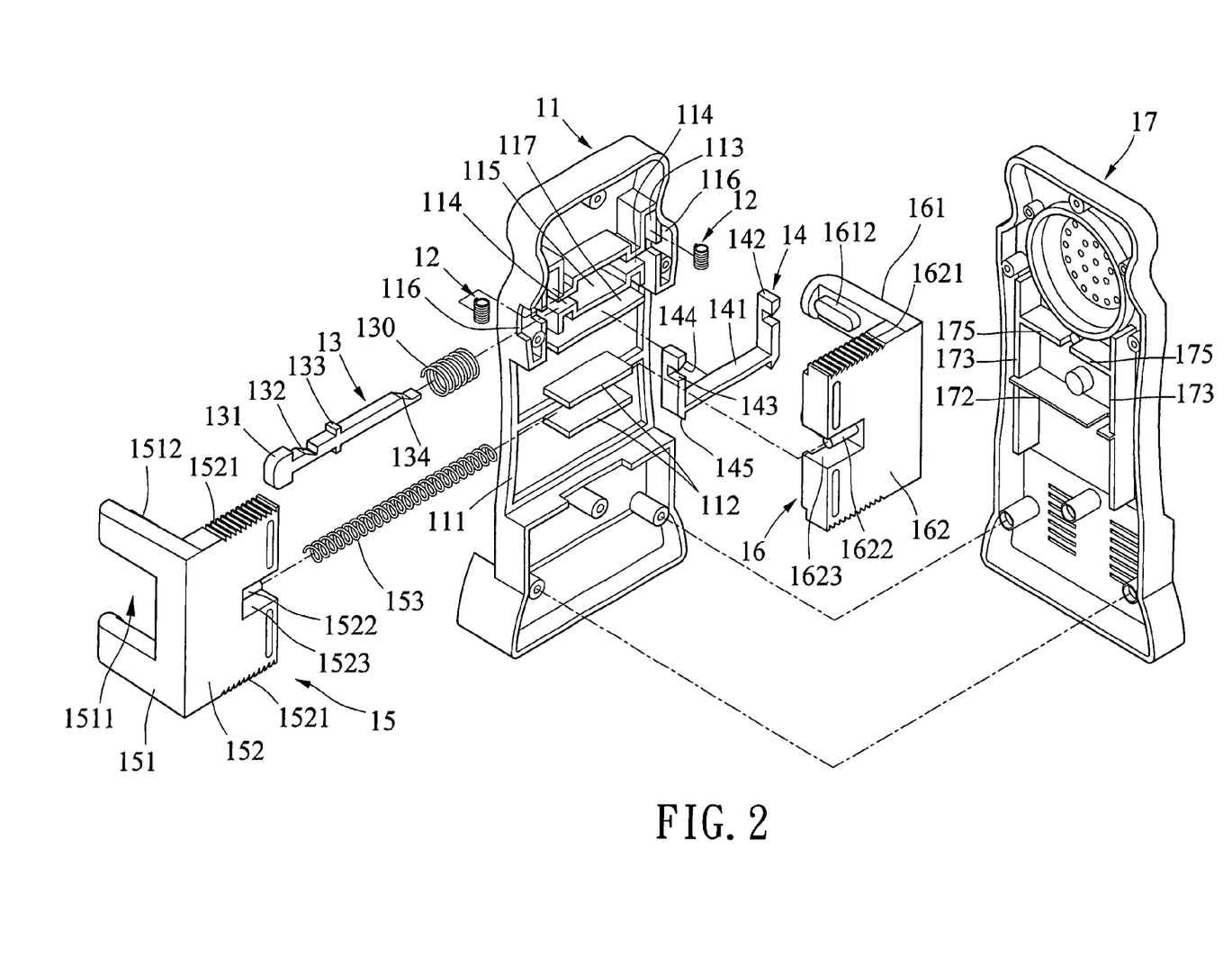
FIG. 2 is an exploded perspective view of the clamp of FIG. 1.

The front cover 11 is substantially rectangular. On its back there are provided an intermediate recess 111 open to both sides, two parallel plates 112 in the recess 111, two upper, longitudinal slots 113 proximate both sides, two transverse first grooves 114 each below the slot 113, an enlarged, transverse second groove 115 between the first grooves 114 and in communication therewith, two transverse third grooves 116 each disposed externally of the slot 113, and a transverse fourth groove 117 below the grooves 114 and 115.

Each resilient member (e.g., compression spring) 12 is provided in an upper portion of the slot 113. A spring (e.g., compression spring) 130 is anchored in the second groove 115. The spring 130 is put on the elongated trigger member 13. The trigger member 13 comprises a finger tab 131 externally of the front and rear covers 11 and 17, a slanted slot 132 proximate the finger tab 131, a riser 133 proximate the slanted slot 132, and a distal internal oblique surface 134 in which the slanted slot 132 is provided in a joining portion of the slot 113 and the first groove 114 at one side in a non-operating position and the slanted slot 132 is adapted to slide toward the first groove 114 in a width adjustment operation. The riser 133 is provided in the second groove 115 and has one end being urged by the spring 130. The oblique surface 134 is substantially in a joining portion of the slot 113 and the first groove 114 at the other side in a non-operating position and is adapted to move a limited distance when the trigger member 13 slides.

The U-shaped shuttle member 14 comprises a horizontal member 141 provided in the fourth groove 117, two vertical members 142 each provided in a lower portion of the slot 113 for urging the resilient member 12 upward, two notches 143 each provided in the vertical member 142 so that the trigger member 13 may be provided across the notches 143, two slopes 144 each provided at an upper edge of the notch 143, and two latches 145 each provided on an underside of the vertical member 142.

The left arm 15 is an L-shaped member as viewed from its top and comprises a clamping section 151 projected forwardly, the clamping section 151 including a central, rectangular opening 1511 and an elongate pad 1512 protruded inwardly from an inner surface of an upper portion of the clamping section 151, and a sliding section 152 projected from one opening of the recess 111 and including a plurality of parallel ridges 1521 on its top and bottom respectively, an intermediate cavity 1523, and a transverse pin 1522 in the cavity 1523.

The right arm 16 is a mirror image of the left arm 15 and thus comprises a clamping section 161 projected forwardly, the clamping section 161 including a central, rectangular opening 1611 and an elongate pad 1612 protruded inwardly from an inner surface of an upper portion of the clamping section 161, and a sliding section 162 projected from the other opening of the recess 111 and including a plurality of parallel ridges 1621 on its top and bottom respectively, an intermediate cavity 1623, and a transverse pin 1622 in the cavity 1623. A spring (e.g., compression spring) 153 is substantially anchored in a space defined by the plates 112 and has its right portion put on the pin 1622 and its left portion put on the pin 1522. Such enables each of the left arm 15 and the right arm 16 to elastically retract toward or extend from the body of the clamp 1.

The rear cover 17 is dimensioned and shaped to threadedly secure to the front cover 11 after the above components have been mounted. The rear cover 17 comprises two longitudinal ribs 173 each having an upper portion provided in the slot 113, two spaced transverse first ribs 175 provided in the first grooves 114 and the second groove 115, and a transverse second rib 172 below the first ribs 175.

Referring to FIGS. 3 to 7 specifically, retraction and extension operations of the arms 15 and 16 prior to firmly clamping a portable electronic device will be described in detailed below. First, push the finger tab 131 toward the body of the clamp 1 to slide the slanted slot 132 and the oblique surface 134 inwardly (see FIG. 5). The slopes 144 move upward due to the upward movements of both the inclined surface of the slanted slot 132 and the oblique surface 134 (i.e., the shuttle member 14 moves upward). In the mean time, the resilient members 12 are compressed and the latches 145 clear the ridges 1521 and 1621. At this state, both arms 15 and 16 are free to extend due to the expansion of the spring 153 (see FIGS. 4 and 5).

Figure 3:
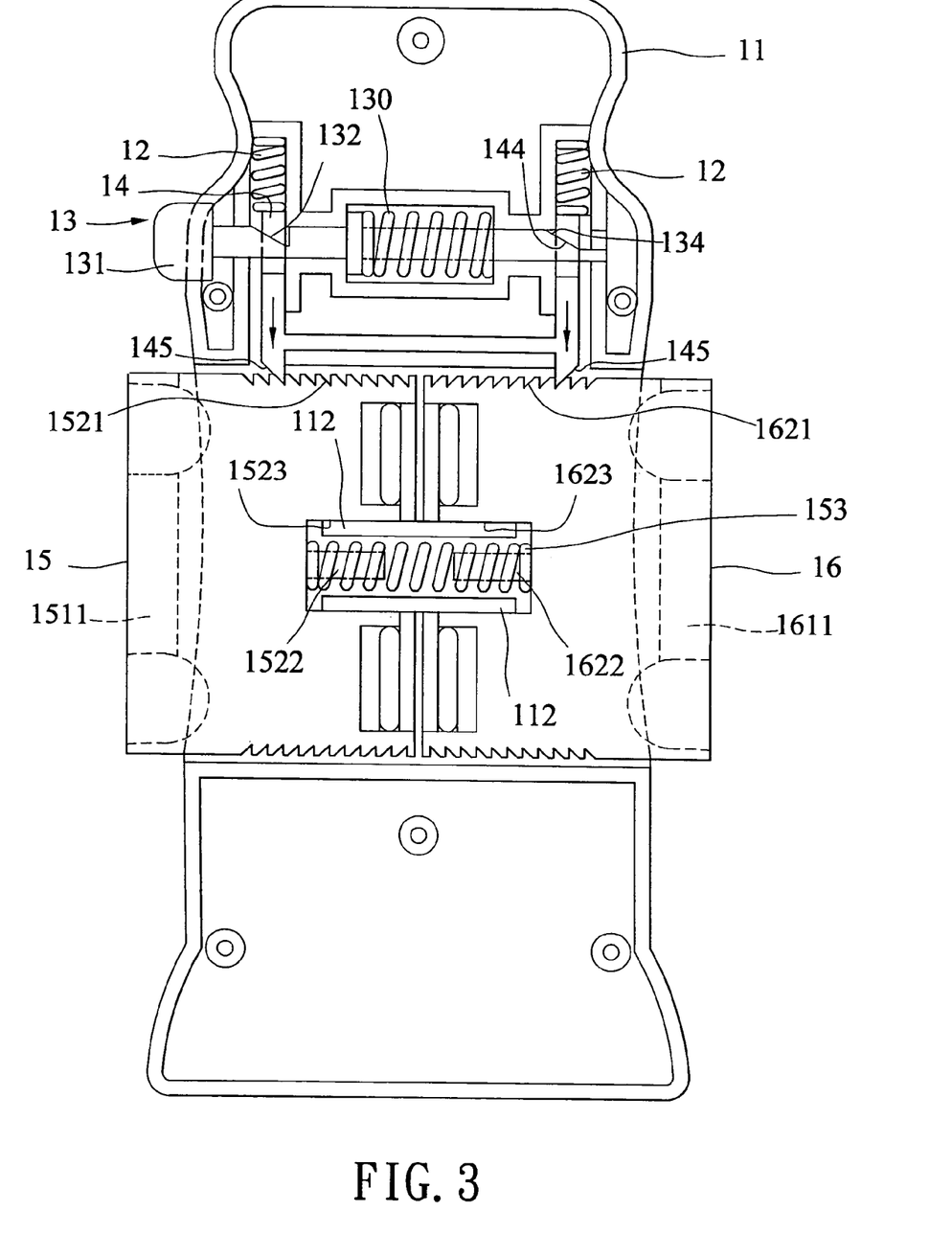
FIG. 3 is a schematic sectional view of the clamp in which both arms are retracted toward the body in a maximum extent.
Figure 4:
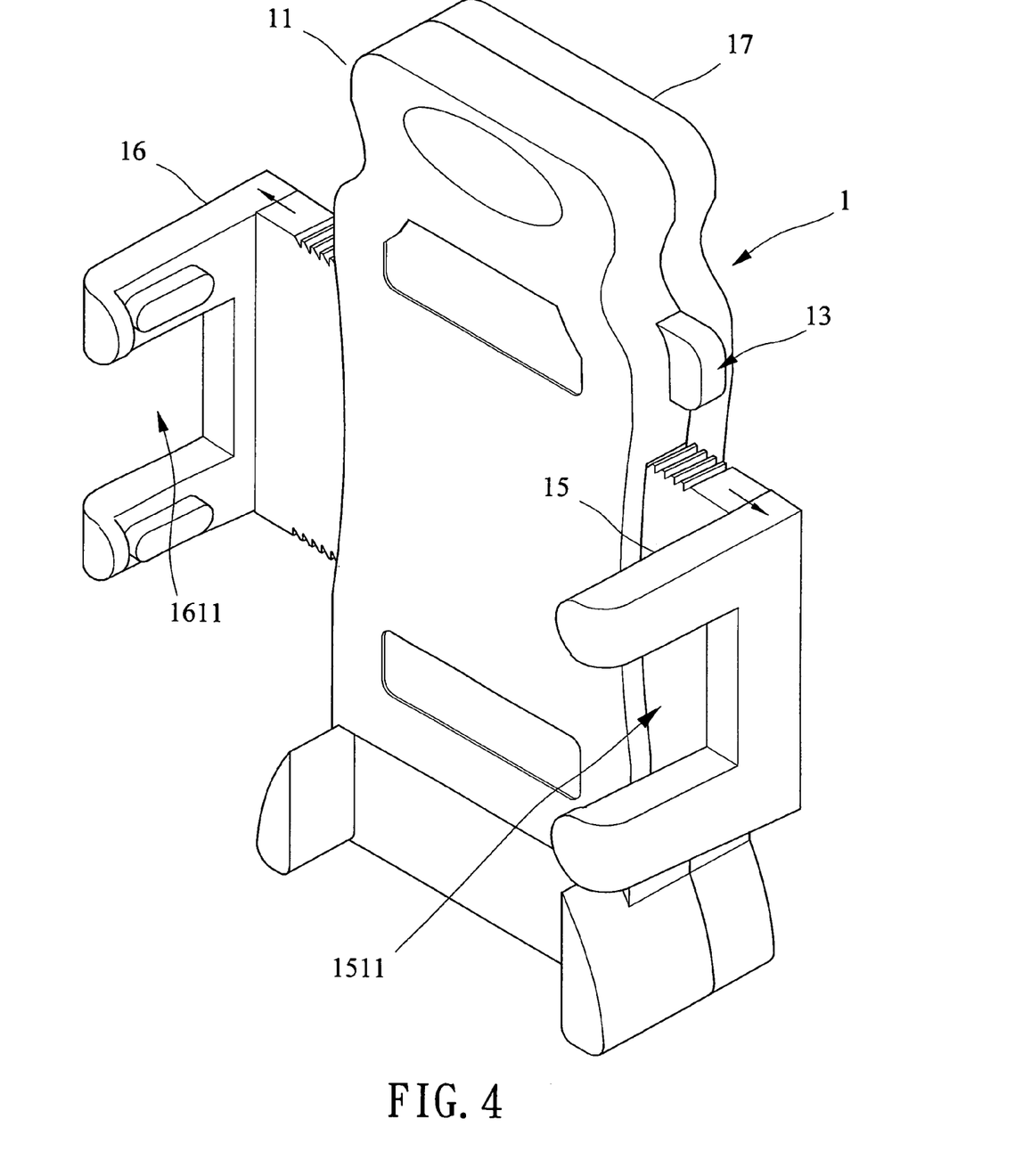
FIG. 4 is a perspective view of the clamp in which both arms are extended to its maximum.
Figure 5:
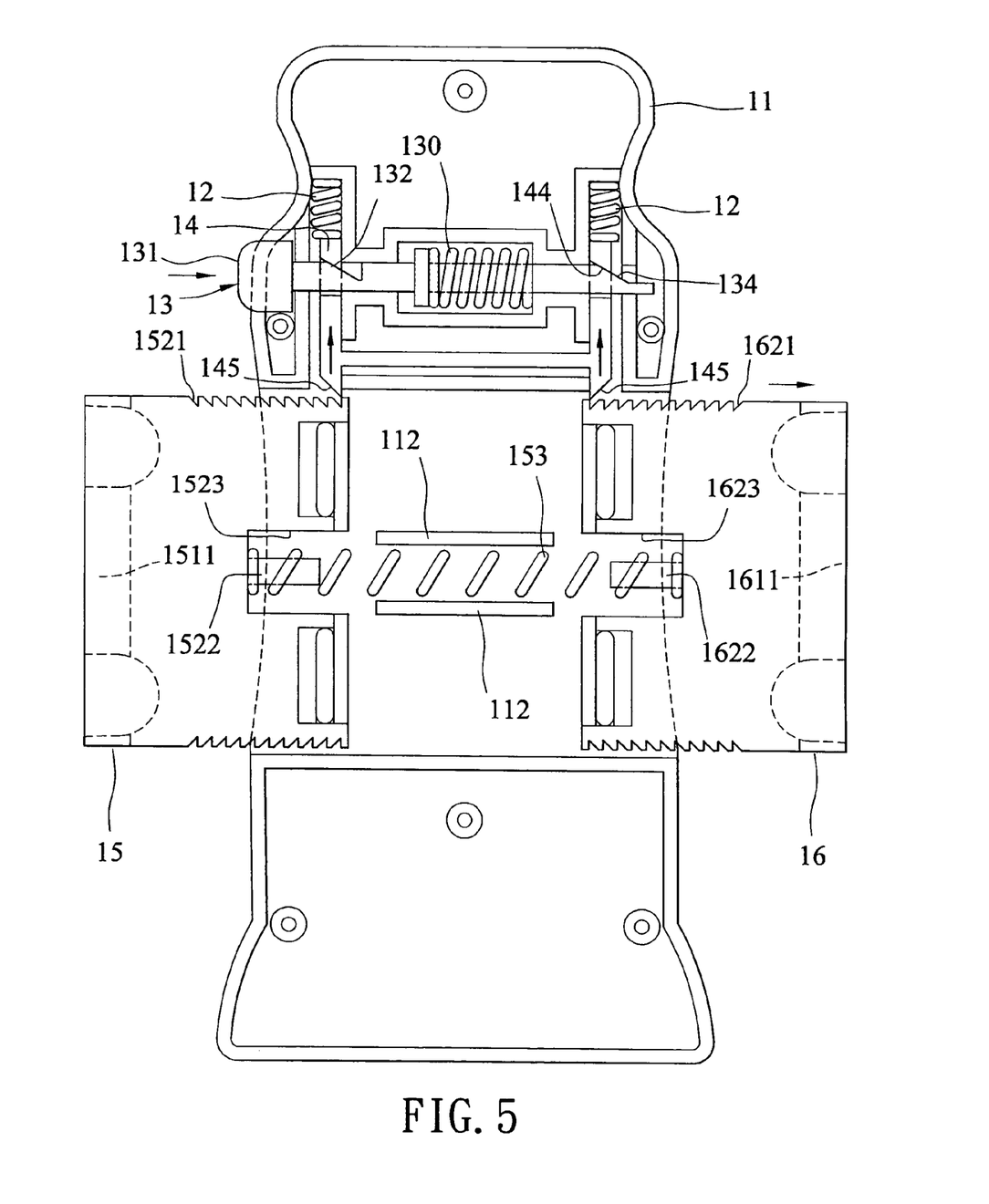
FIG. 5 is a view similar to FIG. 3 for illustrating the extended arms shown in FIG. 4.
Figure 6:
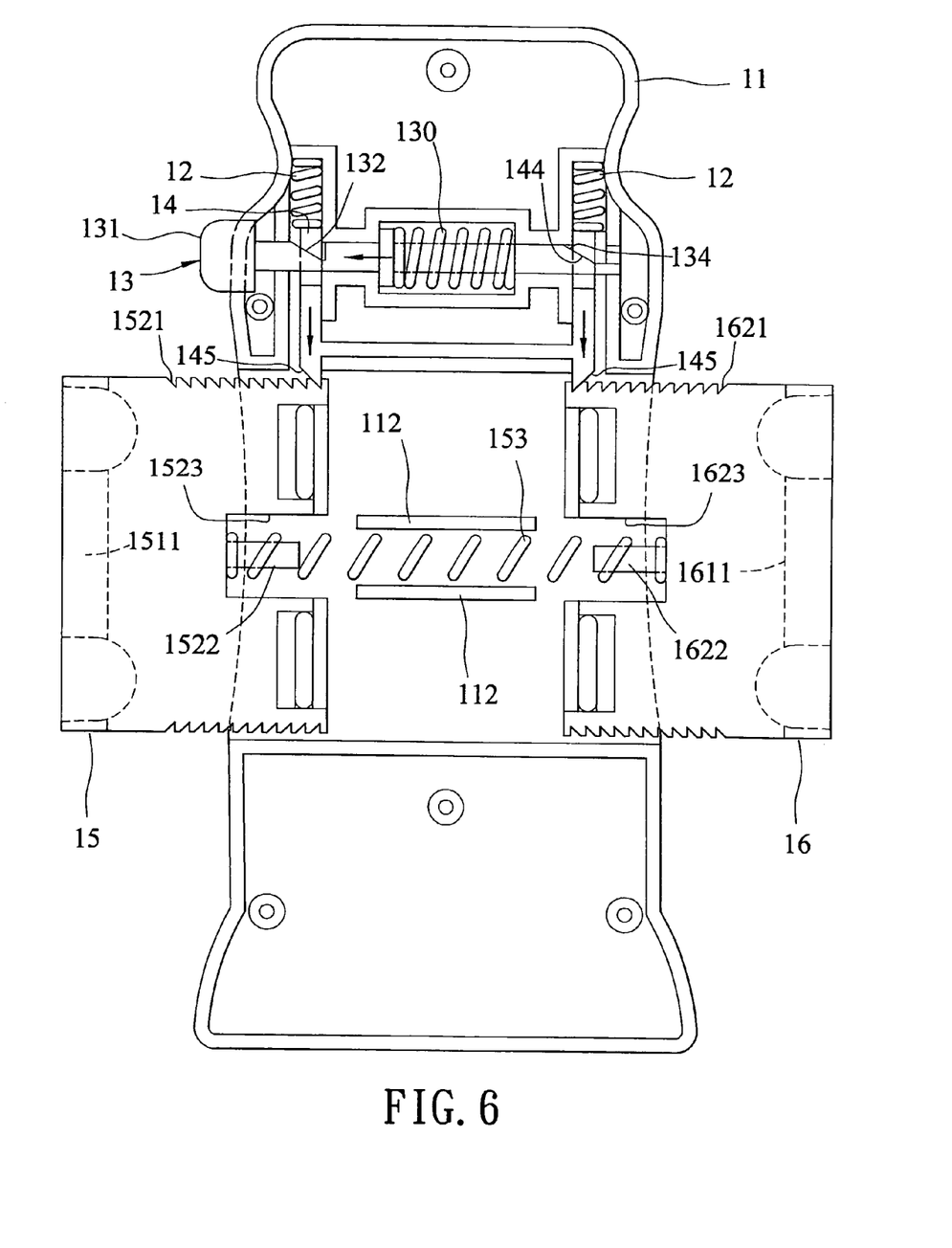
FIG. 6 is a view similar to FIG. 3 for illustrating the completion of the width adjustment of both arms.

Referring to FIGS. 3 and 6 specifically, once width adjustments of both arms 15 and 16 are completed a user may release the finger tab 131 and thus the spring 130 expands to push the trigger member 13 outward. In the mean time the resilient members 12 also expand downward to push the shuttle member 14 downward. The latches 145 engage with the ridges 1521 and the 1621 again for locking (i.e., fixing the adjusted widths of both arms 15 and 16).

In the embodiment the portable electronic device is a cellular phone, smart phone, or PDA which has its ports provided at one side or both sides thereof. Advantageously, the openings 1511 and 1611 are adapted to allow the ports to dispose therein when the portable electronic device is clamped by the clamp 1. That is, the fastened portable electronic device is free from being interfered by the clamp 1 during its operation.

Figure 7:
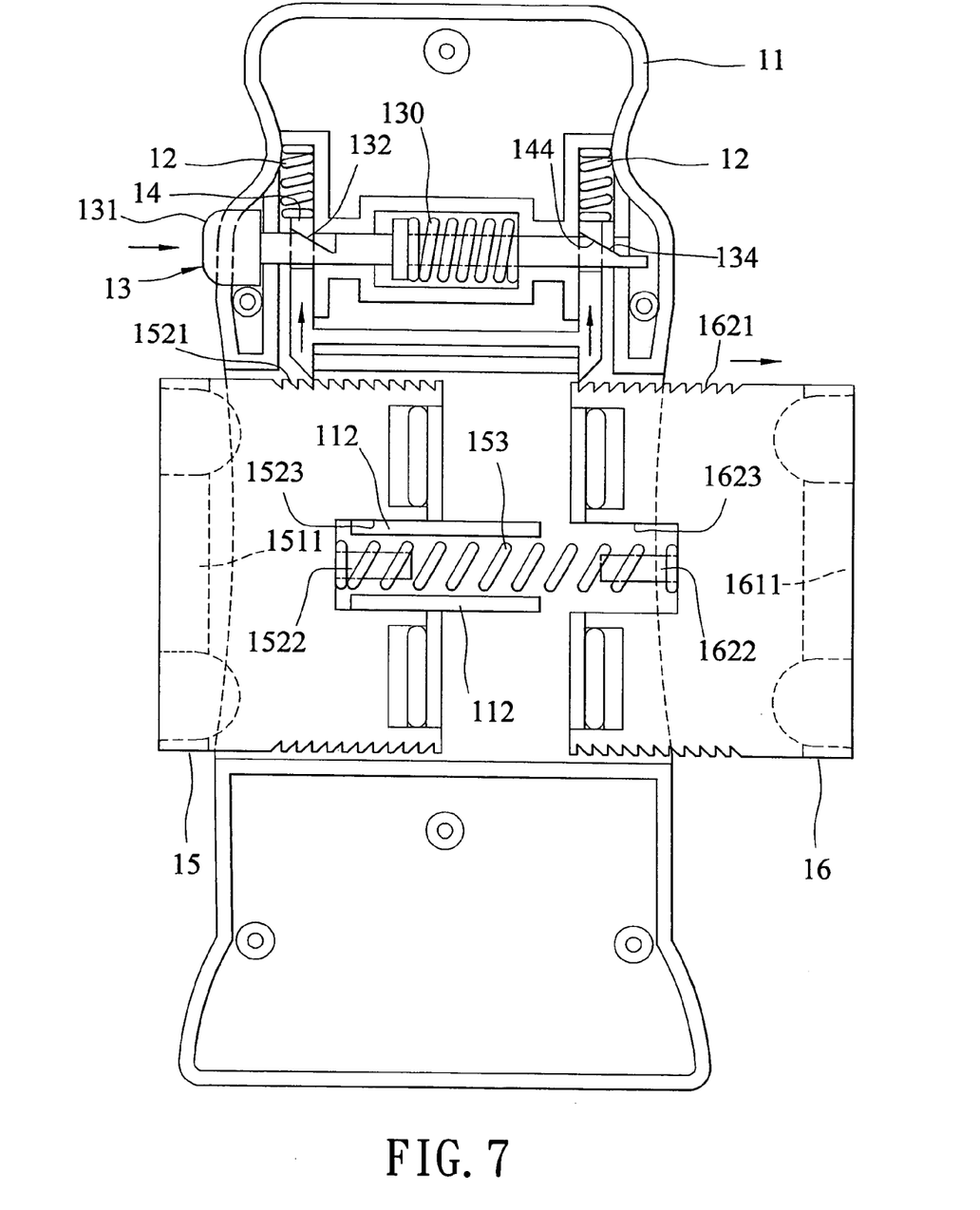
FIG. 7 is a view similar to FIG. 3 for illustrating the operation of adjusting width of either arm.

Referring to FIG. 7 specifically, an operation of adjusting width of either arm is illustrated below. First, push the finger tab 131 toward the body of the clamp 1 to slide the slanted slot 132 and the oblique surface 134 inwardly. The slopes 144 move upward due to the upward movements of both the inclined surface of the slanted slot 132 and the oblique surface 134 (i.e., the shuttle member 14 moves upward). In the mean time, the resilient members 12 are compressed and the latches 145 clear the ridges 1521 and 1621. At this state, both arms 15 and 16 are free to extend due to the expansion of the spring 153. However, instead of the above for example, the movement or a portion of movement of the left arm 15 is blocked by one hand and only the right arm 16 is free to extend until a desired width thereof is reached.

While the invention herein disclosed has been described by means of specific embodiments, numerous modifications and variations could be made thereto by those skilled in the art without departing from the scope and spirit of the invention set forth in the claims.

What is claimed is:

1. A clamp for fastening a portable electronic device comprising:
   a body comprising a front cover (11) of substantially rectangular, the front cover (11), on its back, comprising an intermediate recess (111) open to its both sides, two parallel plates (112) disposed in the recess (111), two upper, longitudinal slits (113) disposed at its both sides, two transverse first grooves (114) each disposed below the slit (113), an enlarged, transverse second groove (115) disposed between the first grooves (114) and being in communication therewith, two transverse third grooves (116) each disposed externally of the slit (113), and a transverse fourth groove (117) disposed below the first and second grooves (114, 115); and a rear cover dimensioned and shaped to releasably secure to the front cover;
   two first resilient members (12) each disposed in an upper portion of the slit (113);
   a second resilient member (130) anchored in the second groove (115);
   a trigger member (13) comprising a finger tab (131) disposed externally of the body, a slanted slot (132) proximate the finger tab (131), a riser (133) disposed in the second groove (115), and a distal, internal oblique surface (134), wherein the slanted slot (132) is disposed proximate a joining portion of one slit (113) and the first groove (114), the second resilient member (130) is put on the trigger member (13) and has one end urged against the riser (133), and the oblique surface (134) is disposed proximate a joining portion of the other slit (113) and the first groove (114);
   a shuttle member (14) comprising a horizontal member (141) disposed in the fourth groove (117), two vertical members (142) each disposed in a lower portion of the slit (113) for urging the first resilient member (12) upward, two notches (143) each disposed in the vertical member (142) so that the trigger member (13) is adapted to dispose across the notches (143), two slopes (144) each disposed at an upper edge of the notch (143), and two latches (145) each disposed on an underside of the vertical member (142);

left and right arms (15, 16) each comprising a clamping section (151, 161) extended forwardly and a transverse sliding section (152, 162) slidably projected from one end opening of the recess, the sliding section (111) including a plurality of parallel ridges (1521, 1621) on its top, an intermediate cavity (1523, 1623), and a transverse pin (1522, 1622) in the cavity (1523, 1623);

a third resilient member (153) substantially anchored in a space defined by the plates (112) and having its right portion put on one pin (1622) and its left portion put on the other pin (1522), and whereby pushing the finger tab (131) toward the body will move the shuttle member (14) upward to compress the first resilient members (12), cause the latches (145) to clear the right and left ridges (1521, 1621), and cause the third resilient member (153) to expand for extending both the left and right arms (15, 16); and in response to placing the electronic device between the clamping sections and engaging therewith releasing the finger tab (131) will expand the first and second resilient members (12, 130) to push the trigger member (13) outward and the shuttle member (14) downward respectively for causing the latches (145) to lockingly engage with the left and right ridges (1521, 1621).

2. The clamp of claim 1, wherein each of the first, second, and third resilient member (12, 130, 153) is a compression spring.

3. The clamp of claim 1, wherein a distance between the left and right arms (15, 16) is adapted to adjust by sliding one of the left and right arms (15, 16) toward or away from the other one or sliding both the left and right arms (15, 16) toward or away from each other.

4. The clamp of claim 1, further comprising a pad (1512, 1612) protruded inwardly from an inner surface of each clamping section of the left and right arms (15, 16).

5. The clamp of claim 1, wherein the shuttle member (14) is of U-shaped.

6. The clamp of claim 1, wherein the rear cover (17) comprises two longitudinal ribs (173) each having an upper portion disposed in the slit (113), two spaced transverse first ribs (175) disposed in the first grooves (114) and the second groove (115), and a transverse second rib (172) disposed below the transverse first ribs (175).

7. The clamp of claim 1, wherein each clamping section comprises a central, rectangular opening (1511, 1611) and each of the left and right arms (15, 16) has a transverse, L-shaped section in its upper and lower portion respectively.

8. The clamp of claim 1, wherein the slanted slot (132) of the trigger member (13) is disposed proximate a joining portion of one of the slits (113) and the first groove (114), and the oblique surface (134) of the trigger member (13) is disposed proximate a joining portion of the other one of slits (113) and the first groove (114).

* * * * *